UNITED STATES PATENT OFFICE.

ROBERT H. PATTERSON, OF HAMMERSMITH, ENGLAND.

IMPROVEMENT IN THE MANUFACTURE OF GAS.

Specification forming part of Letters Patent No. 137,713, dated April 8, 1873; application filed March 26, 1873.

*To all whom it may concern:*

Be it known that I, ROBERT HOGARTH PATTERSON, of Hammersmith, in the county of Middlesex and Kingdom of England, gentleman, have invented Improvements in the Purification of Coal-Gas, of which the following is a specification:

This invention relates, first, to the production of alkaline sulphides; and, secondly, to the employment of the said sulphides, and also of sulphur, for purifying coal-gas from sulphur, while the carbonic acid contained in the gas is likewise eliminated, with a corresponding increase in the illuminating power of the gas. It also relates to the application of the decarbonating and sulphureting processes herein described in connection with the general purification of coal-gas.

I. My process for producing alkaline sulphides in gas-works is based on the chemical fact (which I have been the first to turn to practical account) that carbonic acid has a greater affinity for the undermentioned alkalies than sulphureted hydrogen has. The process is as follows: Impure coal-gas is passed through vessels, herein called decarbonating-vessels, containing an alkaline substance—such as lime, soda, potash, ammonia, or the ammoniacal solution called gas-liquor—for such time that the $CO_2$ contained in the said gas shall, from its greater affinity for these alkalies, have expelled the $SH_2$, taking its place and driving it (namely, $SH_2$) forward with the gas into a vessel or vessels containing any of the above-named alkaline substances which it is desired to convert into sulphides. As soon as the gas issuing from the decarbonating-vessels shows the presence of carbonic acid the contents of one or more of them are to be changed and the vessels recharged with fresh alkaline substances; and whenever, or soon after, the gas issuing from the vessels containing the alkaline substances to be sulphureted shows the presence of sulphureted hydrogen the process of producing the sulphides is complete.

First, I apply this process to the production of sulphides of calcium, (as distinct from the material called "gas-lime" or "foul lime," which, under the existing methods of working lime-purifiers, may be wholly, and is always partly, carbonate of lime,) and also to a new method of working lime-purifiers, as follows: Impure gas is passed through the first lime purifier or purifiers of the series for such time that the carbonic acid, from its greater affinity for lime, shall have expelled suphureted hydrogen from the said purifier or purifiers, taking its place and driving it (namely, sulphureted hydrogen) forward into the succeeding purifiers. By this means the carbonic acid can be wholly eliminated from the gas by the first purifier or purifiers, while sulphureted hydrogen, being driven forward, converts the contents of the succeeding purifier or purifiers into sulphides of calcium, which is a highly efficient material for purifying coal-gas from sulphur in other forms than that of sulphureted hydrogen. Thereupon these latter-mentioned purifiers—now containing sulphides of calcium—may be used first in the series, and the gas passed through them into subsequent purifiers containing fresh lime, whereby the contents of these subsequent purifiers, or of any one of them, can be converted, in turn, into sulphides of calcium; or the first purifier or purifiers of the series may be constantly employed, chiefly for the purpose of eliminating carbonic acid from the gas, while sulphur in all forms is eliminated from the gas in the succeeding purifiers. By thus decarbonating the gas in the first purifiers of the series the lime, in any number of the subsequent purifiers, can be converted into sulphides of calcium, and also thereafter maintained in the form of sulphides as long as may be desired.

Second, I apply this process to the production of sulphides of sodium, of potassium, and of ammonium, as follows: Impure coal-gas is passed through lime-purifiers, or through washers or scrubbers containing a solution of soda, of potash, or of ammonia or gas-liquor, in such manner (as above described in § I—1) that the $CO_2$ is arrested in these vessels, while $SH_2$ is driven forward into a vessel or vessels containing alkaline solutions (whether of soda, of potash, of ammonia, or of non-carbonated or decarbonated gas-liquor) which it is desired to convert into sulphides.

Third, I also apply this process to the more highly sulphureting of the ammoniacal solution called gas-liquor, whether decarbonated or not; and I do so in the manner described in the preceding paragraph, (§ I—2.)

Fourth, I also propose to employ sulphides of calcium, of sodium, and of potassium, produced by mixing sulphur with lime, with soda, or with potash, or otherwise, as is well understood, either in solution or otherwise.

II. I propose to employ the above-named alkaline sulphides for the purpose of purifying coal-gas from sulphur in other forms than that of sulphureted hydrogen. One method of doing so, other than that which I have described relative to the working of lime-purifiers, (vide § I—1,) is as follows: After condensing, scrubbing, and eliminating sulphureted hydrogen by oxide-of-iron purifiers in the ordinary manner, I pass the gas through lime-purifiers, or through washers or scrubbers containing an alkaline solution, so as to eliminate the carbonic acid; and therefore I pass the gas through washers or scrubbers containing either sulphides of sodium or of potassium, or of ammonium, or the more highly sulphureted gas-liquor described in § I, 3. whereby the gas will be purified from the sulphur existing therein in other forms than that of sulphuretted hydrogen. Or, the purification of coal-gas first from carbonic acid, and thereafter from sulphur in all forms, may be effected entirely by the employment of alkaline washers or scrubbers, as follows: An alkaline solution, whether of soda or of lime, or of potash or of ammonia, or gas-liquor, is formed or placed in a series of washers or scrubbers, which are to be employed in the manner already described for the working of lime-purifiers, (vide § I—1,) whereby the carbonic acid is eliminated in the first vessel or vessels of the series, while sulphur in all forms is eliminated in the subsequent vessels. For economy and convenience, I prefer to employ ordinary gas-liquor for this purpose, applying the decarbonating and sulphureting processes already described—that is to say: After coal-gas has been condensed in the ordinary manner, I effect the purification of the said gas from $CO_2$, and from sulphur in all forms, by passing it (the gas) through a series of washers or scrubbers, such as, but greater in number and by preference in height than, are at present employed to absorb the ammonia from the gas, in such manner (vide § I—1) that the $CO_2$ (carbonic acid) is eliminated by the first vessel or vessels of the series, while $SH_2$ (sulphureted hydrogen) is driven forward with the gas, and converts the liquor or ammoniacal solution in the subsequent vessels of the series into sulphides of ammonium. In so doing, I return the said liquor into or retain it in the first vessel or vessels of the series for such time that the $CO_2$ (carbonic acid) contained in the gas shall, from its greater affinity for the said ammoniacal liquor, have expelled $SH_2$ (sulphureted hydrogen) from the first vessel or vessels of the series taking its place, and driving it (namely, sulphureted hydrogen) forward with the gas into the subsequent vessels, thereby sulphureting or converting into sulphides of ammonium the ammoniacal liquor contained in subsequent vessels of the series.

In order that this system of purification may be fully understood, I make the following remarks: Under the present system of purifying coal-gas from ammonium by means of washers or scrubbers, the gas issuing from those vessels, or from the last of the series, usually contains carbonic acid in much larger quantity than sulphureted hydrogen; but by turning to practical account the greater affinity which $CO_2$ has for ammonia than $SH_2$ has, in the manner already described, and by employing the first washers or scrubbers of the series as decarbonators, the $CO_2$ can be eliminated in these first vessels of the series, while the $SH_2$ displaced by the $CO_2$ from the gas-liquor, or otherwise passing forward with the gas, sulphurets or converts into sulphides of ammonium the ammoniacal liquor contained in the subsequent vessels, which latter vessels, while and in consequence of thus absorbing the sulphureted hydrogen, become efficient agents for eliminating from the gas the sulphur existing therein in other forms than that of sulphureted hydrogen. A final vessel or vessels may be used with advantage to absorb and eliminate any ammonia or sulphureted hydrogen which may escape or pass forward with the gas from the immediately preceding vessels (that is, those which occupy the middle place in the series) containing the sulphides of ammonium.

The process of working the immediately-before-mentioned series of alkaline washers or scrubbers upon the principle or system herein repeatedly described will vary to some extent according to the number of those vessels employed, and also according to the relative proportions in which ammonia and carbonic acid and sulphureted hydrogen exist in the gas which is to be thus purified. If in any case the quantity of ammonia in the gas be not sufficient to absorb the whole of the carbonic acid, and also thereafter to absorb the sulphureted hydrogen, in so doing producing sulphides of ammonium in the latter vessels of the series, or if from any cause it be deemed expedient to increase the alkaline strength of the liquor employed in the series of washers or scrubbers, a solution of soda or other alkaline substance may be employed in addition to the ammonia existing in the gas, in order to produce the desired results above mentioned.

III. I also propose to purify coal-gas from sulphur in other forms than that of sulphureted hydrogen by means of sulphur, by preference in a state of fine division, used either by itself or along with sawdust or such like substances as together with sulphur will form a porous material through which the gas can pass freely.

The sulphur, either alone or in conjunction with the before-mentioned materials, may be used in the ordinary purifiers in gas-works, and the gas is to be passed through the said material after being purified from sulphureted hydrogen.

I claim—

1. The application and use, substantially as herein described, of alkaline sulphides—namely, sulphides of calcium, sulphides of sodium, sulphides of potassium, sulphides of ammonium, and also gas-liquor more highly sulphureted by the process hereinbefore described, employed in separate purifying-vessels—for the purpose of purifying coal-gas from sulphur in other forms than that of sulphureted hydrogen.

2. The process herein described for producing alkaline sulphides from lime in purifiers, or a solution of soda, lime, potash, ammonia, or gas-liquor in washers or scrubbers, in connection with the purification of gas, to wit, by eliminating the carbonic acid in the first of the series of said vessels and the sulphur in its several forms in the succeeding vessels, whereby the lime or other alkaline substances in any number of said succeeding vessels can be converted into sulphides of said alkaline substances, and thereafter maintained in the form of sulphides as long as may be desired.

3. The method or system of employing a series of alkaline washers or scrubbers—namely, vessels containing gas-liquor or a solution of soda, of lime, of potash, or of ammonia, or of any or all of these substances in conjunction, in the manner hereinbefore described, whereby coal-gas is purified from carbonic acid in the first vessel or vessels of the series, and the sulphur existing in the gas in all forms is eliminated in the subsequent vessels of the series.

4. The employment of sulphur in a state of fine division in conjunction with a substance or substances suitable to form a porous material through which the gas may pass freely, or in combination with lime, or with potash, or with soda, or with lime, potash, and soda together, in solution or otherwise, in order to effect the purification of coal-gas from sulphur existing therein in other forms than that of sulphureted hydrogen, or of any or all of these substances in conjunction, substantially as described.

In witness whereof I have signed my name to this specification in the presence of two subscribing witnesses.

R. H. PATTERSON.

Witnesses:
CHAS. MILLS,
47 *Lincoln's Inn Fields, London.*
FREDK. C. DYER,
47 *Lincoln's Inn Fields, London.*